United States Patent
Sun (10) Patent No.: US 9,230,197 B2
(45) Date of Patent: Jan. 5, 2016

(54) RECORDING MEDIUM AND LABEL PRODUCTION PROCESSING METHOD

(71) Applicant: Brother Kogyo Kabushiki Kaisha, Nagoya-shi, Aichi-ken (JP)

(72) Inventor: Yongqi Sun, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/230,200

(22) Filed: Mar. 31, 2014

(65) Prior Publication Data
US 2014/0307268 A1    Oct. 16, 2014

(30) Foreign Application Priority Data

Apr. 10, 2013 (JP) ................. 2013-082090

(51) Int. Cl.
| | |
|---|---|
| G06K 15/02 | (2006.01) |
| G06F 3/12 | (2006.01) |
| B41J 2/325 | (2006.01) |

(52) U.S. Cl.
CPC .......... *G06K 15/024* (2013.01); *B41J 2/325* (2013.01); *G06F 3/1201* (2013.01); *G06F 3/1205* (2013.01); *G06F 3/1232* (2013.01); *G06F 3/1253* (2013.01); *G06F 3/1285* (2013.01); *G06F 3/1293* (2013.01)

(58) Field of Classification Search
None
See application file for complete search history.

(56) References Cited

U.S. PATENT DOCUMENTS

| | | | | |
|---|---|---|---|---|
| 5,920,684 | A * | 7/1999 | Hastings et al. | 358/1.13 |
| 6,776,343 | B1 * | 8/2004 | Gold et al. | 235/472.01 |
| 7,616,338 | B2 * | 11/2009 | Vleurinck et al. | 358/1.18 |
| 8,082,495 | B2 * | 12/2011 | Nose et al. | 715/252 |
| 2002/0051177 | A1 * | 5/2002 | Nomoto | 358/1.15 |
| 2002/0054345 | A1 * | 5/2002 | Tomida et al. | 358/1.15 |
| 2002/0073039 | A1 * | 6/2002 | Ogg et al. | 705/60 |
| 2003/0037008 | A1 * | 2/2003 | Raju et al. | 705/60 |
| 2004/0059995 | A1 * | 3/2004 | Takabayashi et al. | 715/500 |
| 2004/0236789 | A1 * | 11/2004 | Uchida et al. | 707/104.1 |
| 2004/0265026 | A1 * | 12/2004 | Lermant et al. | 400/76 |
| 2005/0134625 | A1 * | 6/2005 | Kubota | 347/19 |
| 2005/0271864 | A1 * | 12/2005 | van Driesten et al. | 428/195.1 |
| 2009/0237704 | A1 * | 9/2009 | Minowa | 358/1.14 |

(Continued)

FOREIGN PATENT DOCUMENTS

| | | |
|---|---|---|
| JP | 2004-058306 A | 2/2004 |
| JP | 2005-339217 A | 12/2005 |
| JP | 2011-009980 A | 1/2011 |

*Primary Examiner* — Ted Barnes
(74) *Attorney, Agent, or Firm* — Banner & Witcoff, Ltd.

(57) ABSTRACT

A non-transitory computer readable recording medium storing a label production processing program for executing steps on an arithmetic device of an operation terminal, to operate a label producing apparatus is disclosed. The steps include an identification information acquiring step that acquires identification information of the label producing apparatus from at least one of a plurality of label producing apparatuses configured to transmit and receive information, a medium information acquiring step that acquires medium information on the attached print-receiving medium from the label producing apparatus from which the identification information has been acquired, and a displaying step that displays on the display device menu screens in which the identification information and the medium information corresponding to the identification information are displayed as a list, to set alternatively the label producing apparatus which is a print output destination from among the at least one of the label producing apparatuses.

3 Claims, 9 Drawing Sheets

(56) References Cited

U.S. PATENT DOCUMENTS

| | | | |
|---|---|---|---|
| 2010/0026738 A1* | 2/2010 | Saikawa et al. | 347/1 |
| 2010/0060909 A1* | 3/2010 | Conescu et al. | 358/1.9 |
| 2010/0127490 A1* | 5/2010 | Novack et al. | 283/71 |
| 2010/0131378 A1* | 5/2010 | Novack et al. | 705/26 |
| 2010/0328714 A1* | 12/2010 | Allen et al. | 358/1.15 |
| 2011/0217106 A1* | 9/2011 | Shimomura | 400/76 |
| 2011/0286012 A1* | 11/2011 | De Munck et al. | 358/1.6 |
| 2012/0027493 A1* | 2/2012 | Yap et al. | 400/619 |
| 2012/0268775 A1* | 10/2012 | Chang et al. | 358/1.15 |
| 2012/0269564 A1* | 10/2012 | Collins et al. | 400/76 |
| 2013/0063780 A1* | 3/2013 | Dullaert et al. | 358/1.15 |

\* cited by examiner

RECORDING MEDIUM AND LABEL PRODUCTION PROCESSING METHOD

CROSS-REFERENCE TO RELATED APPLICATION

The present application claims priority from Japanese Patent Application No. 2013-082090, which was filed on Apr. 10, 2013, the disclosure of which is incorporated herein by reference in its entirety.

FIELD

The present disclosure relates to a recording medium and a label production processing method for operating a label producing apparatus that performs printing on a print-receiving medium and produces a label.

DESCRIPTION OF THE RELATED ART

Among printer systems in each of which an operation terminal, such as a PC, and a plurality of printers are connected to one another through a network, there has been known one that displays a menu screen for selecting the printer on the operation terminal. In this printer system, when a user manually selects a printer to make it perform printing on the menu screen, the operation terminal makes the selected printer perform printing.

SUMMARY

In order to achieve the above-mentioned object, according to the aspect, there is provided a label production processing program for executing steps on an arithmetic device of an operation terminal comprising a display unit and an arithmetic device, to operate a label producing apparatus configured to print on a print-receiving medium configured to be attached to and detached from an apparatus housing and configured to produce a label. The steps comprise an identification information acquiring step that acquires identification information of the label producing apparatus from at least one of a plurality of label producing apparatuses configured to transmit and receive information, a medium information acquiring step that acquires medium information on the attached print-receiving medium from the label producing apparatus from which the identification information has been acquired, and a displaying step that displays on the display device menu screens in which the identification information and the medium information corresponding to the identification information are displayed as a list, to set alternatively the label producing apparatus which is a print output destination from among the at least one of the label producing apparatuses.

DESCRIPTION OF THE EMBODIMENTS

Hereinafter, one embodiment of the present disclosure will be explained with reference to drawings.

<Configuration of Label Producing System>

First, with reference to FIG. 1, will be explained an overall configuration of a label producing system including an operation terminal that executes a label production processing program of the present embodiment.

Figure 1:
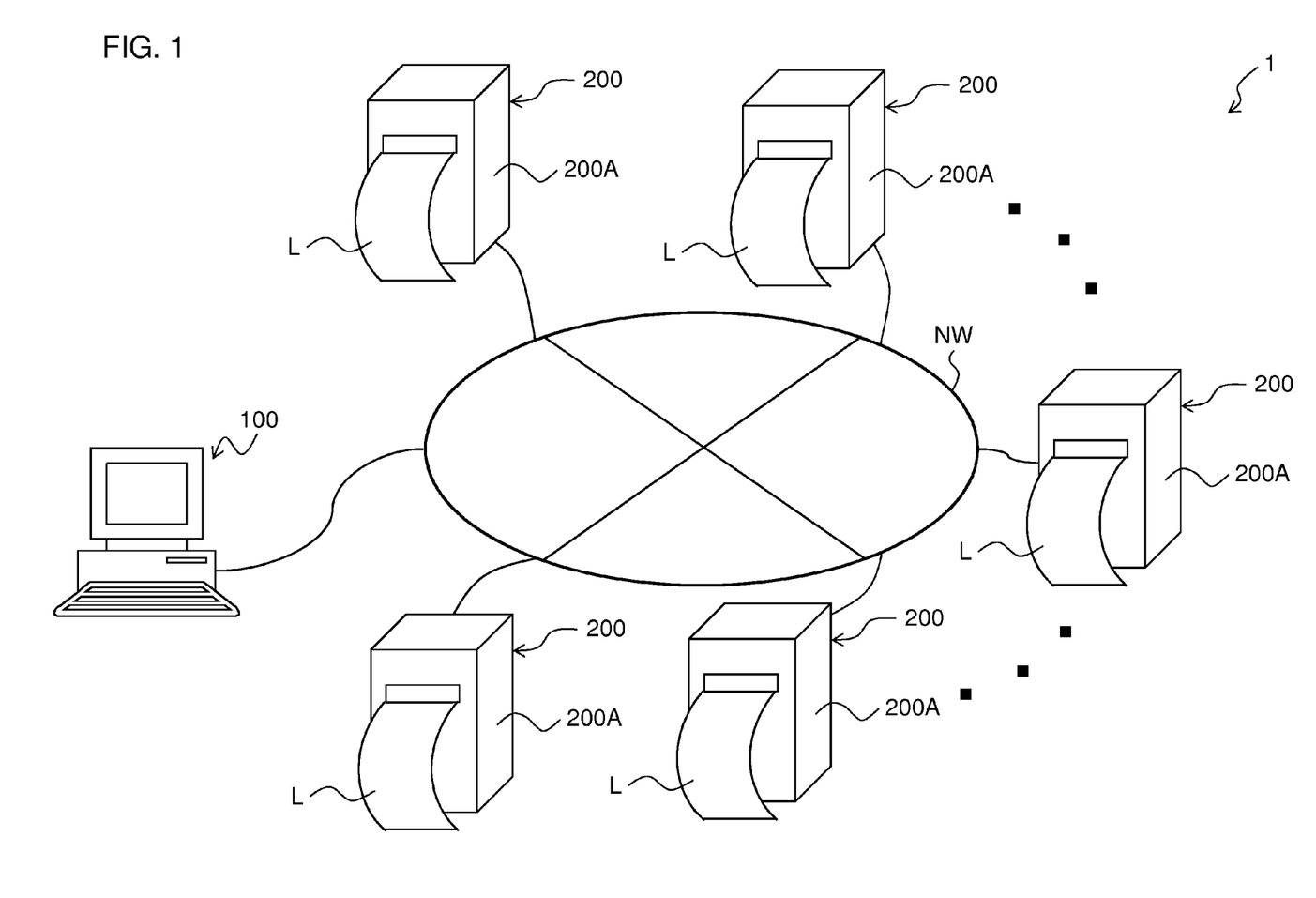
FIG. 1 is a system configuration diagram showing an overall configuration of a printing system including an operation terminal that executes a label production processing program of one embodiment of the present disclosure.

As shown in FIG. 1, a label producing system 1 has an operation terminal 100 and a plurality of label producing apparatuses 200. The operation terminal 100 and the plurality of label producing apparatuses 200 are connected to each other capable of information transmission and reception through a wired or wireless network NW.

The operation terminal 100 is the terminal for operating the label producing apparatuses 200. This operation terminal 100 is not particularly limited as long as it is a terminal operable by a user and, for example, a general-purpose PC, a tablet PC, a PDA, a multifunctional mobile phone, etc. can be used. In an example shown in FIG. 1, illustrated is a case where a general-purpose PC is used as the operation terminal 100.

Figure 2:
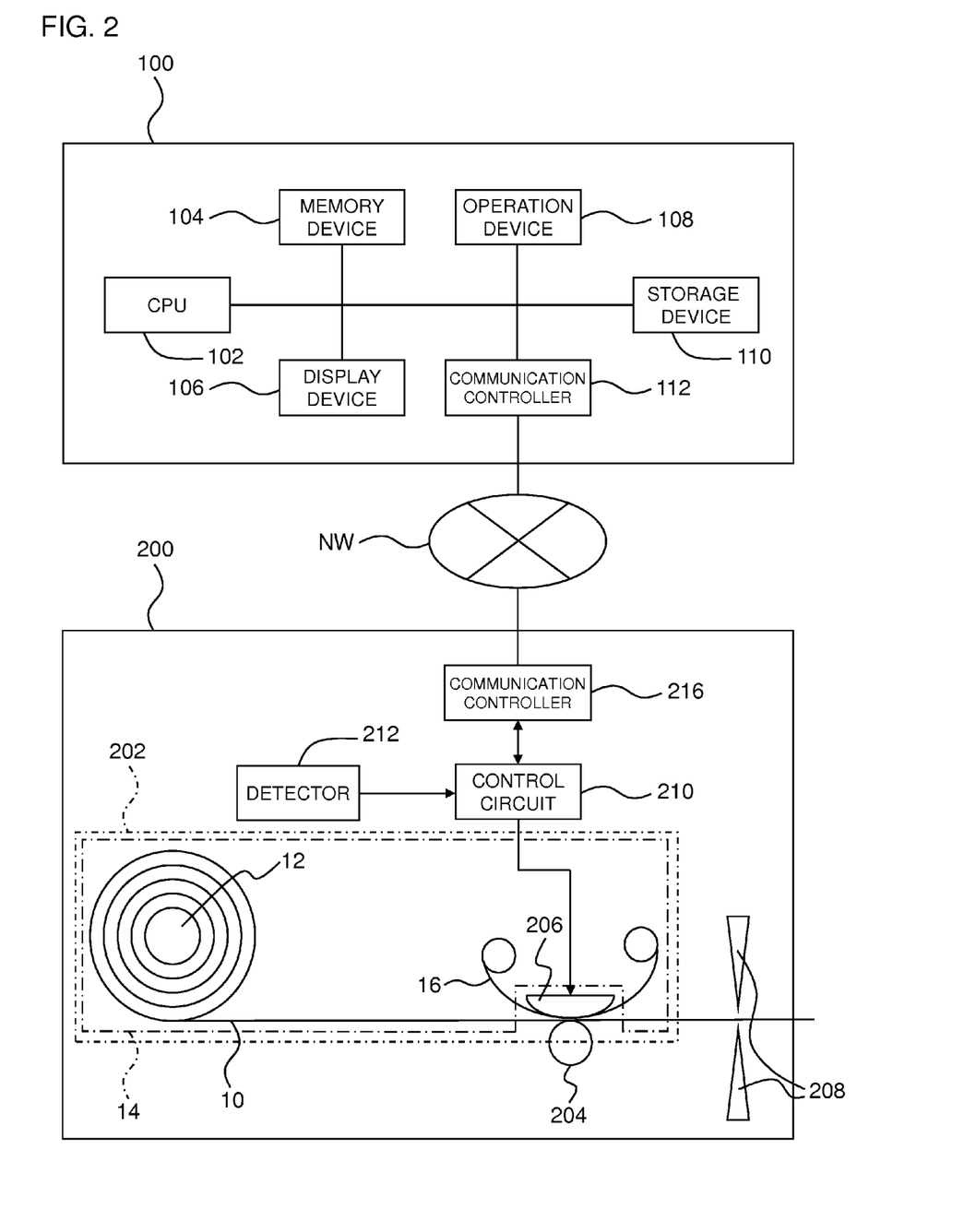
FIG. 2 is a block diagram conceptually showing configurations of an operation terminal and a label producing apparatus.

The label producing apparatus 200 performs desired printing corresponding to image data input from the operation terminal 100, such as a character, a figure, and a photograph, respectively, and produces a label L, while feeding a print-receiving tape 10 (a print-receiving medium, refer to after-mentioned FIG. 2). Although details will be mentioned later, the print-receiving tape is adapted to be detachable from an apparatus housing 200A of the label producing apparatus 200 as a tape roll or a cartridge.

<Configurations of Operation Terminal and Label Producing Apparatus>

Next, configurations of the operation terminal 100 and the label producing apparatus 200 will be conceptually explained with reference to FIG. 2.

As shown in FIG. 2, the operation terminal 100 has: a CPU 102 (arithmetic device); a memory device 104 that includes, for example, a ROM, a RAM, etc.; a display device 106 that includes, for example, a liquid crystal display etc. and performs various display; an operation device 108 in which a user can perform various operations; a storage device 110 in which various information is stored; and a communication controller 112 that controls information communication performed with the label producing apparatus 200 through the network NW.

Figure 7:
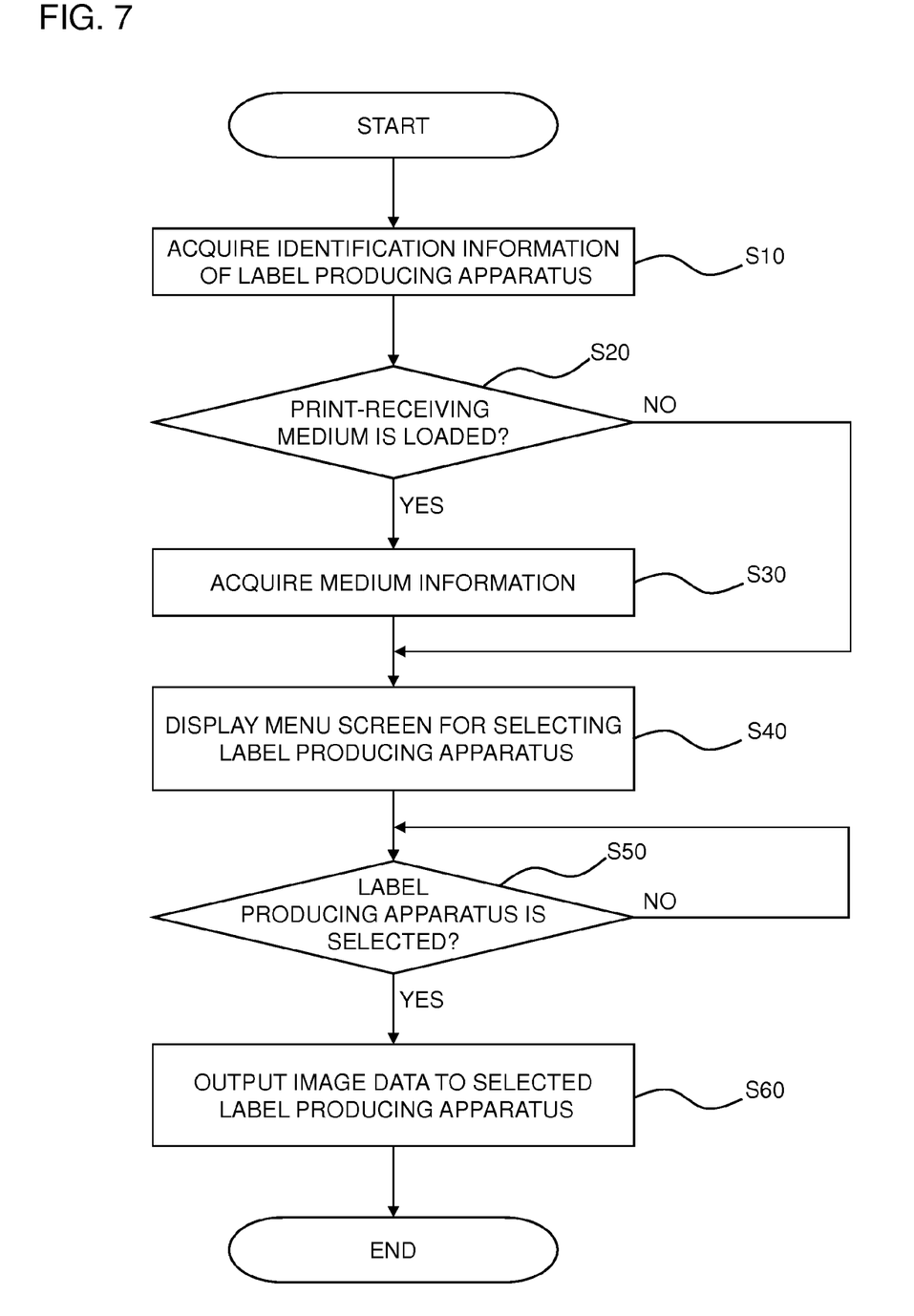
FIG. 7 is a flow chart showing a control content executed by a CPU of the operation terminal.
Figure 9:
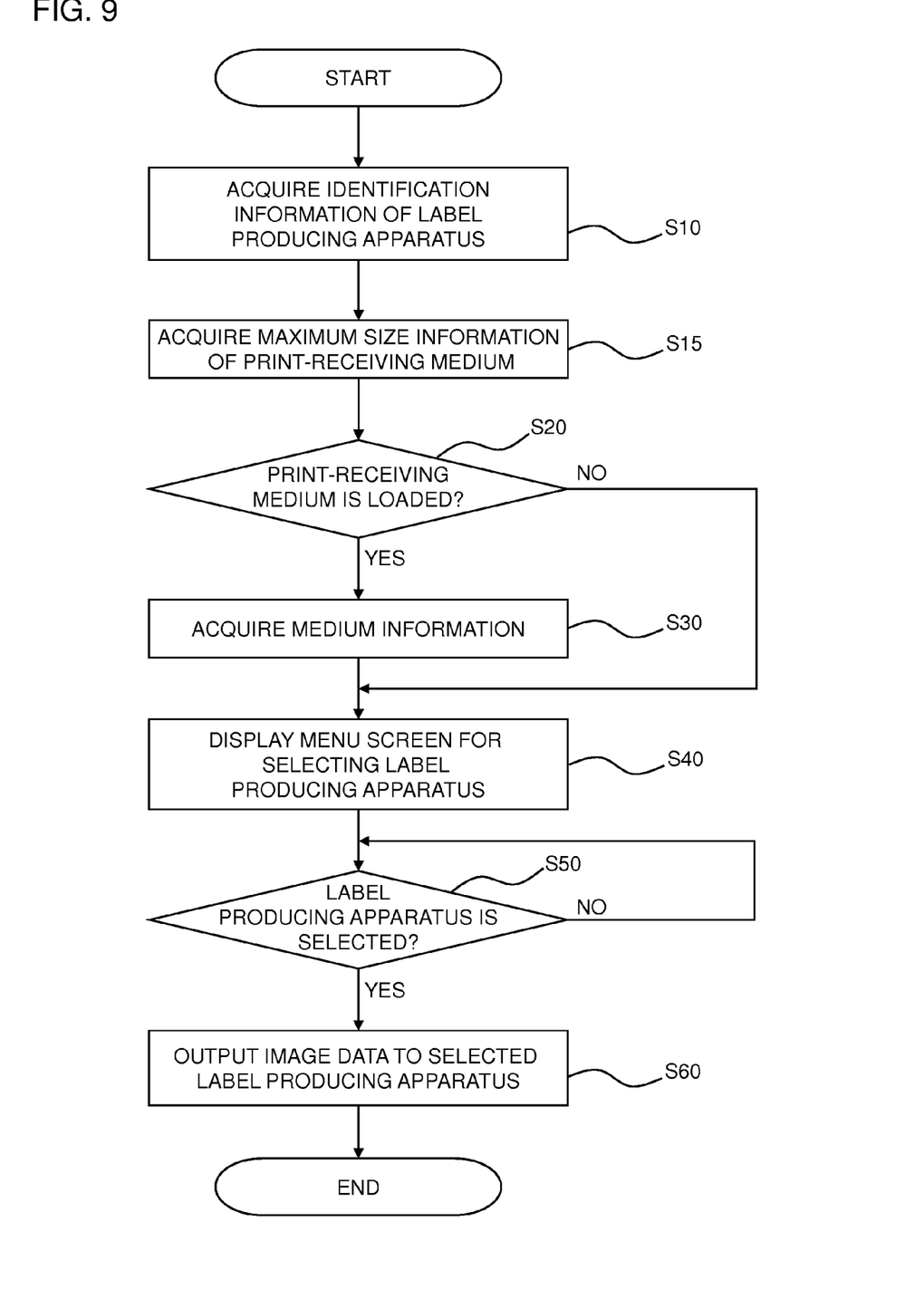
FIG. 9 is a flow chart showing a control content executed by a CPU of an operation terminal in the modified example where displayed are the maximum sizes of the tapes capable of being dealt with by the label producing apparatuses.

The CPU 102 executes various programs (included is a label production processing program for making the CPU 102 execute each step of a label production processing method shown in flows of after-mentioned FIGS. 7 and 9) stored in the ROM of the memory device 104 or the storage device 110, while utilizing a temporary storage function of the RAM of the memory device 104, and thereby performs control of the entire operation terminal 100. In addition, the CPU 102 is connected to the label producing apparatus 200 through the communication controller 112 and the network NW, and can transmit and receive various information to/from the label producing apparatus 200.

In the present embodiment, on the display device 106, displayed is a menu screen 106A (refer to after-mentioned FIG. 6) for alternatively setting the label producing apparatus 200, which is a print output destination of image data that is printed and formed on the label L to be produced, from among the plurality of label producing apparatuses 200. Identification information of the plurality of label producing apparatuses 200 is displayed as a list on this menu screen, and the user performs operational input through the operation device 108 of the operation terminal 100 so as to select the label producing apparatus 200, which is the print output destination.

The label producing apparatus 200 has: a control circuit 210; a holder 202 in which a cartridge 14 or a tape roll 12 is loaded; a feeding device 204; a print head 206; a cutter 208; a detector 212 that detects presence/absence and a type of the cartridge 14 or the tape roll 12 loaded in the holder 202; and a communication controller 216 that controls information communication performed with the operation terminal 100 through the network NW.

The control circuit 210, though not particularly illustrated, includes a CPU, a ROM, and a RAM. The CPU of this control circuit 210 controls the entire label producing apparatus 200 by executing various programs previously stored in the ROM, while utilizing the temporary storage function of the RAM. In addition, the CPU of the control circuit 210 is connected to the operation terminal 100 through the communication controller 216 and the network NW, and can transmit and receive various information to/from the operation terminal 100.

From the holder 202, detachable is the tape roll 12 around which the print-receiving tape 10 used by the label producing apparatus 200 has been wound (although it is originally spiral, it is illustrated as a concentric circle for simplification), or the cartridge 14 including this tape roll 12.

The feeding device 204 feeds the print-receiving tape 10 fed out from the tape roll 12 or the cartridge 14 loaded in the holder 202.

The print head 206 is disposed facing the feeding device 204, and performs desired printing corresponding to the image data input from the operation terminal 100 on the print-receiving tape 10 that is fed out and fed from the tape roll 12 by the feeding device 204. In the present embodiment, when the tape roll 12 is loaded in the holder 202, the print-receiving tape 10 fed out from the tape roll 12 is a thermal tape, a plurality of heater elements of the print head 206 is energized, and thereby printing is performed on the surface of the print-receiving tape 10, which is the thermal tape. Meanwhile, when the cartridge 14 is loaded in the holder 202, printing is performed on the print-receiving tape 10 fed out from the cartridge 14 using an ink ribbon 16 included in the cartridge 14.

The cutter 208 cuts into a desired length of the print-receiving tape 10 for which printing has been ended.

The detector 212 is, for example, disposed on a bottom of the holder 202, etc., and detects presence/absence of loading of the tape roll 12 or the cartridge 14 in the holder 202. When the tape roll 12 or the cartridge 14 is loaded, the detector 212 detects medium information on the loaded tape roll 12 or cartridge 14 by detecting (a support portion of) the tape roll 12 or a portion to be detected (not shown) formed on the cartridge 14.

In the present embodiment, tape widths (12 mm, 18 mm, 24 mm, etc.) as size information of the print-receiving tape 10, and tape colors (white, green, yellow, blue, black, etc.) are included in the above described medium information. In addition, in the medium information, also included is attachment and detachment type information that indicates whether the print-receiving tape 10 is attached to and detached from the apparatus housing 200A as the above described tape roll 12 wound in a rolled form, or is attached to and detached from the apparatus housing 200A as the cartridge 14 in which the tape roll 12 and the ink ribbon 16 are stored in a case. Furthermore, when the above described attachment and detachment type information indicates a cartridge, ribbon color information of the ink ribbon 16 included in the cartridge 14 is also included in the medium information.

In addition, when the above described attachment and detachment type information indicates the cartridge, in the medium information, also included is cartridge type information that indicates whether the print-receiving tape 10 is a laminate type, which is a cover film formed by bonding a base tape to the print-receiving tape 10 (printing is performed on the cover film), or a receptor type, which is the base tape (printing is directly performed on the base tape), or a fabric type, which is a tape made of a cloth material.

Figure 3:
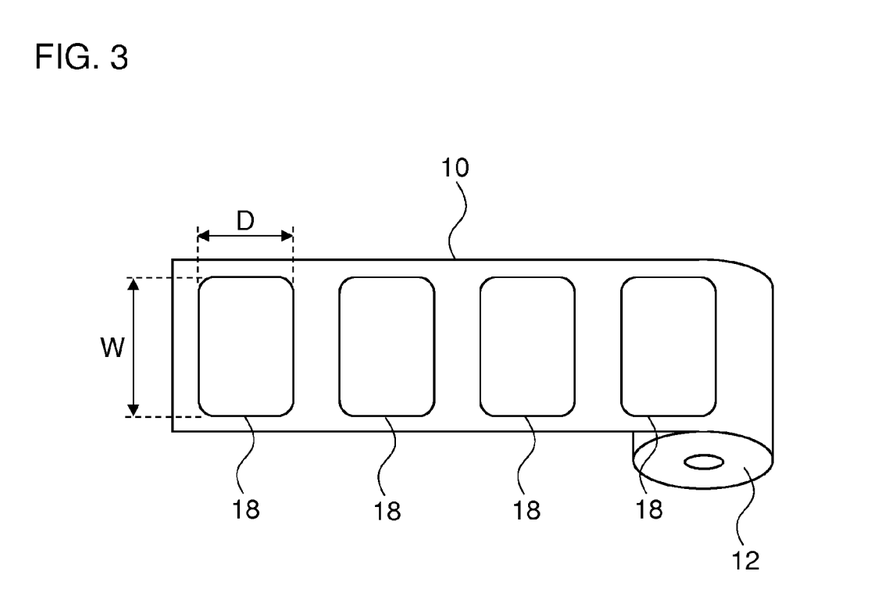
FIG. 3 is an explanatory diagram for explaining a configuration of a die-cut type print-receiving tape.

Furthermore, in the medium information, also included is tape type information that indicates whether the print-receiving tape 10 is a non-fixed length type, or as shown in FIG. 3, a die-cut type in which label mounts 18 previously separated as a desired size corresponding to the label L to be produced are continuously arranged on the tape fed out from the tape roll 12.

It is to be noted that when the print-receiving tape 10 is the above described non-fixed length type, the above described tape widths are included in the medium information as size information of the print-receiving tape 10, and that when the print-receiving tape 10 is the above described die-cut type, a width dimension W and a length dimension D of the above described label mount 18 are included in the medium information as the size information of the print-receiving tape 10.

It is to be noted that although the present embodiment is explained assuming that the above described information is all included in the medium information, only a part of the above described information may be included in the medium information, or information other than the above may be included therein.

<Detailed Structure of Cartridge>

Next, will be explained a detailed structure of the cartridge 14 in the case where the print-receiving tape 10 is the above described laminate type or receptor type.

First, using FIG. 4, will be explained a structure of a peripheral portion of the holder 202 in a state where the above described laminate type cartridge 14 is loaded.

Figure 4:
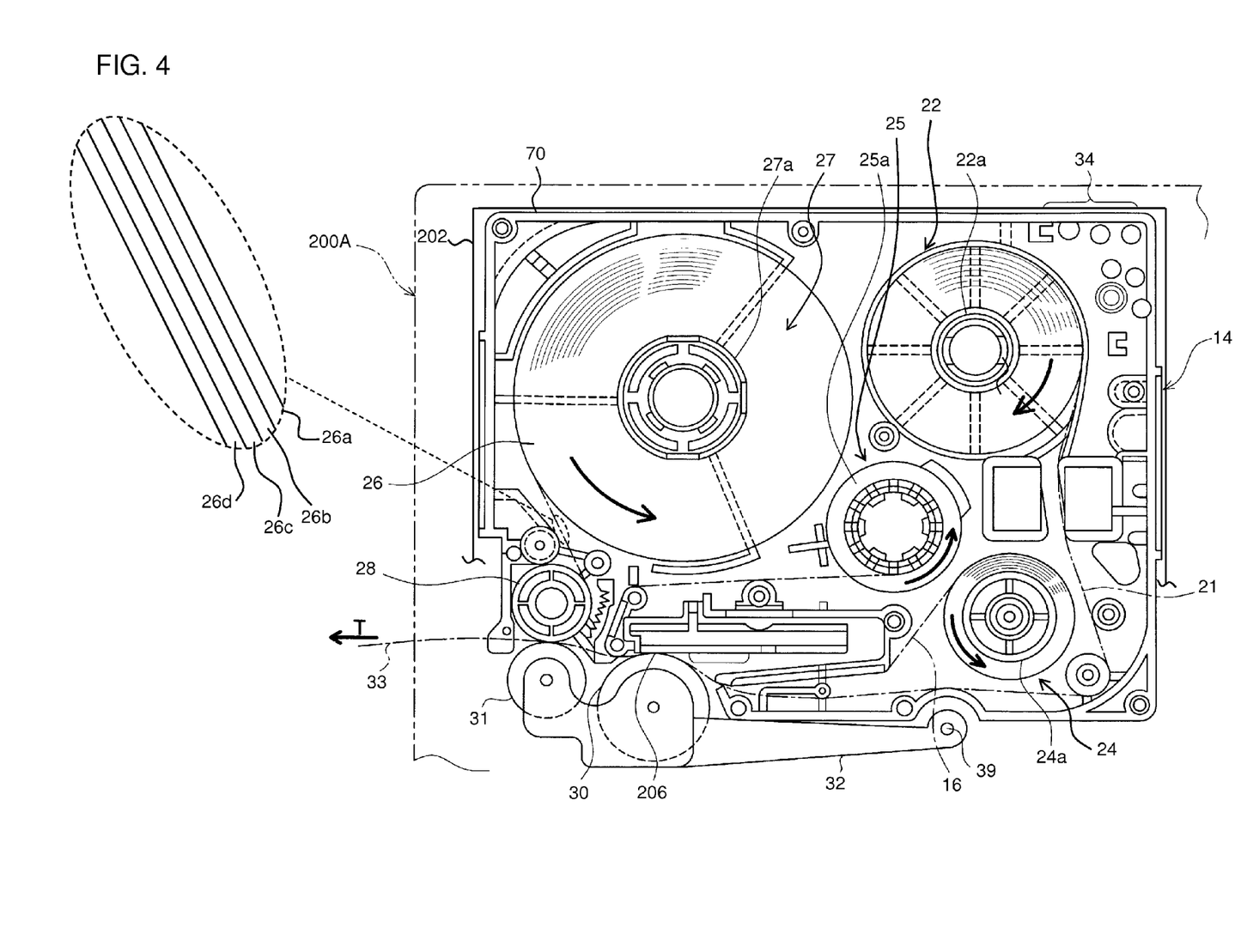
FIG. 4 is an explanatory view showing a detailed structure of a laminate type cartridge.

In FIG. 4, the cartridge 14 is detachably stored in the above described holder 202, which is a recess inside the apparatus housing 200A. In addition, as for the cartridge 14, inside a case 70, stored are: a base tape roll 27 around which a base tape 26 has been wound; a cover film roll 22 (corresponding to the above mentioned tape roll 12) around which a cover film 21 (corresponding to the above mentioned print-receiving tape 10) has been wound; a ribbon supply side roll 24 that feeds out the print ink ribbon 16; a ribbon take-up roller 25 that takes up the ink ribbon 16 after printing; and a feeding roller 28.

In the base tape roll 27, the above described base tape 26 is wound around a base tape spool 27a. The base tape 26 includes a stacked structure of a plurality of layers (four layers in this example) (refer to a partial enlarged view in FIG.

4). Namely, the base tape 26 is configured such that from an innermost at which the layer is wound (right side in FIG. 4) toward an opposite side thereof (left side in FIG. 4), stacked in the following order are: an adhesive layer 26a including an appropriate adhesive for bonding the above described cover film 21 thereto; a tape base layer 26b including, for example, PET (polyethylene terephthalate) etc.; an adhesive layer 26c including an appropriate adhesive; and a separation sheet 26d.

When the finally completed label L is affixed to an object to be affixed such as a desired article, the separation sheet 26d is peeled off, thus allowing the label L to be bonded to the object to be affixed by means of the adhesive layer 26c.

In the cover film roll 22, the cover film 21 that has a substantially same width as the above described base tape 26 in this example is wound around a cover film spool 22a.

In the ribbon supply side roll 24, the ink ribbon 16 is wound around a ribbon supply side spool 24a. The ribbon take-up roller 25 takes up the used ink ribbon 16, and winds it around a ribbon take-up spool 25a.

The feeding roller 28 feeds a tape in a direction shown by an arrow T in FIG. 4, while pressing and bonding the above described base tape 26 and cover film 21 to form a label tape 33 with print.

In addition, at the cartridge 14, detection holes 34 as the above mentioned portions to be detected are formed at a corner (an upper-right corner in FIG. 4) on a side opposite to the above described feeding roller 28. The plurality of detection holes 34 is perforated at desired patterns, and each pattern, as mentioned above, includes the medium information, such as the tape widths of the base tape 26 and the cover film 21 stored in the cartridge 14. The above mentioned detector 212 (refer to FIG. 2) detects the patterns of the detection holes 34 of the each cartridge 14 as described above, and thereby can detect the medium information.

Meanwhile, the holder 202 has the above described print head 206 and a roller holder 32. The print head 206 includes a number of heater elements, and performs printing on a desired print area of the cover film 21 fed out from the above described cover film roll 22.

The roller holder 32 is rotatably pivotally supported by a support shaft 39, and is made switchable to a print position and a release position by a switching mechanism. A platen roller 30 and a tape pressure-contact roller 31 are rotatably disposed at the roller holder 32, and when the roller holder 32 is switched to the above described print position, those platen roller 30 and tape pressure-contact roller 31 are crimped to the above described print head 206 and feeding roller 28.

In the above described configuration, when the cartridge 14 is loaded in the above described holder 202, the feeding roller 28, the platen roller 30, and the tape pressure-contact roller 31 rotate and the base tape 26 is fed out from the base tape roll 27 to be supplied to the feeding roller 28 as mentioned above. Meanwhile, the cover film 21 is fed out from the cover film roll 22, and the plurality of heater elements of the print head 206 is energized. At this time, the ink ribbon 16 is pressed by the above described print head 206 to be brought into contact with a back surface of the cover film 21. As a result, desired printing is performed on the desired print area of the back surface of the cover film 21. The above described base tape 26 and the cover film 21 in which the above described printing has been ended are then bonded and integrated with each other by the feeding roller 28 and the tape pressure-contact roller 31 to be formed as the label tape 33 with print, and it is carried out outside the cartridge 14. The label tape 33 with print is then cut off by the cutter 208, and the label L on which the desired printing has been performed is generated.

Next, using FIG. 5, will be explained a structure of a peripheral portion of the holder 202 in a state where the above described receptor type cartridge 14 is loaded. It is to be noted that in this FIG. 5, a same symbol is given to a portion similar to the above described FIG. 4 and explanation thereof is omitted, and that only different portions are explained.

Figure 5:
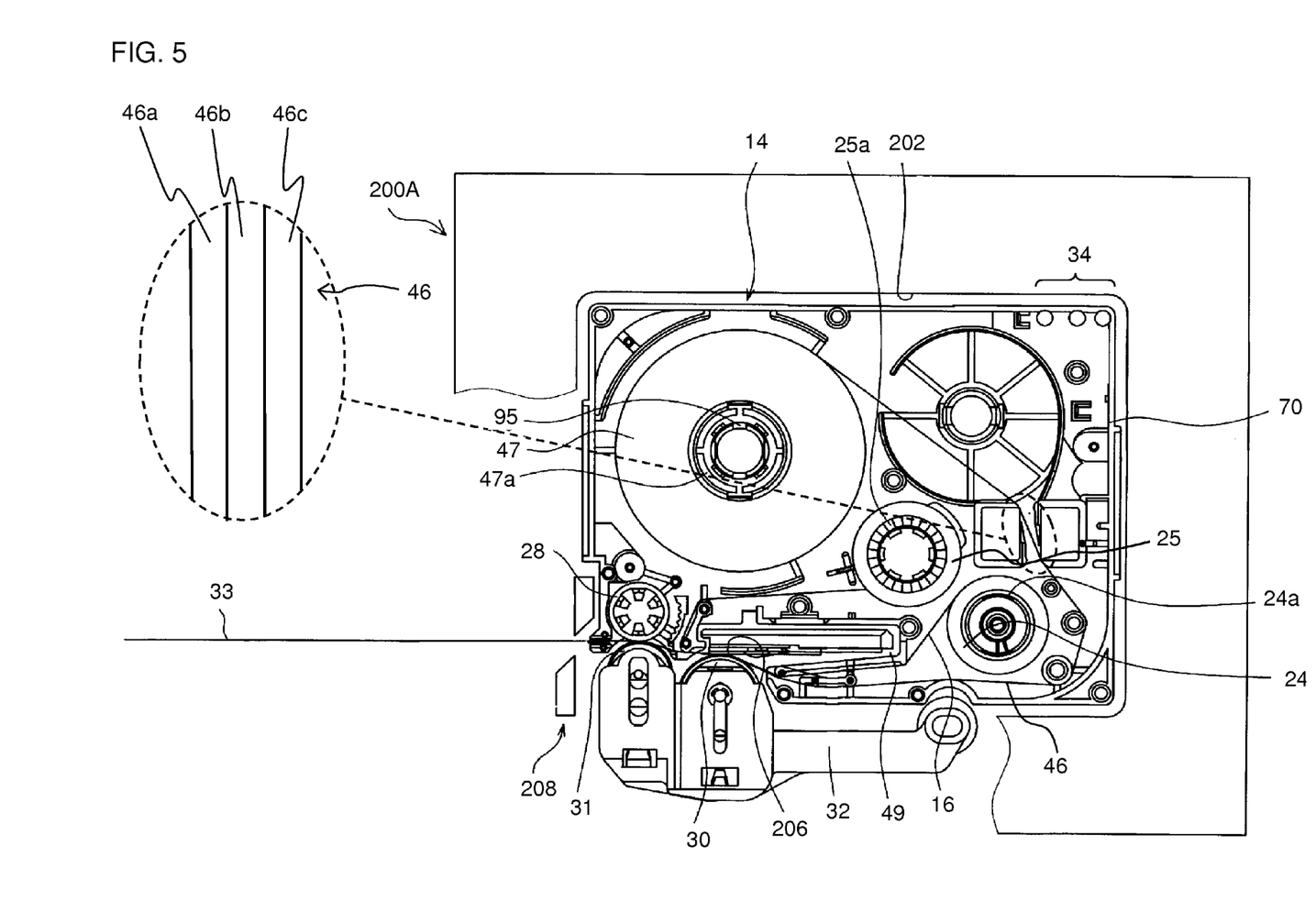
FIG. 5 is an explanatory view showing a detailed structure of a receptor type cartridge.

In FIG. 5, the cartridge 14 has a receptor tape roll 47 (corresponding to the above mentioned tape roll 12) around which a receptor tape 46 (corresponding to the above mentioned print-receiving tape 10) has been wound. This cartridge 14 does not have the cover film roll 22 around which the cover film 21 has been wound unlike the above described laminate type cartridge 14. In the receptor tape roll 47, the above described receptor tape 46 is wound around a receptor tape spool 47a that has been rotatably inserted and stored in a boss 95 vertically disposed on a bottom surface of the cartridge 14.

The receptor tape 46 has a three-layer structure in this example (refer to a partial enlarged view in FIG. 5), and is configured such that from an innermost at which the layer is wound (left side in FIG. 5) toward an opposite side thereof (right side in FIG. 5), stacked in the following order are: a colored base film 46a including PET (polyethylene terephthalate) etc.; an adhesive layer 46b including an appropriate adhesive; and a separation sheet 46c.

When the cartridge 14 is loaded in the holder 202, and the roller holder 32 is moved from the release position to the print position, the receptor tape 46 and the ink ribbon 16 are sandwiched between the print head 206 and the platen roller 30, and also are sandwiched between the feeding roller 28 and the tape pressure-contact roller 31. The feeding roller 28, the tape pressure-contact roller 31, and the platen roller 30 then synchronously rotate, and the receptor tape 46 is fed out from the receptor tape roll 47.

Meanwhile, at this time, the plurality of heater elements of the print head 206 inserted into an opening 49 is energized, desired printing is performed on a surface of the base film 46a of the receptor tape 46, the receptor tape 46 is formed as the label tape 33 with print, and after that, it is carried out outside the cartridge 14. After that, the label tape 33 with print is cut off by the cutter 208, and the label L on which the desired printing has been performed is generated.

It is to be noted that the above described fabric type cartridge 14 has a structure similar to the above mentioned receptor type cartridge 14 except that the above described receptor tape 46 is a tape made of a cloth material.

<One Example of Menu Screen>

As mentioned above, on the display device 106 of the operation terminal 100, displayed is the menu screen for alternatively setting the label producing apparatus 200, which is the print output destination of the image data that is printed and formed, from among the plurality of label producing apparatuses 200. One example of this menu screen is shown in FIG. 6.

Figure 6:
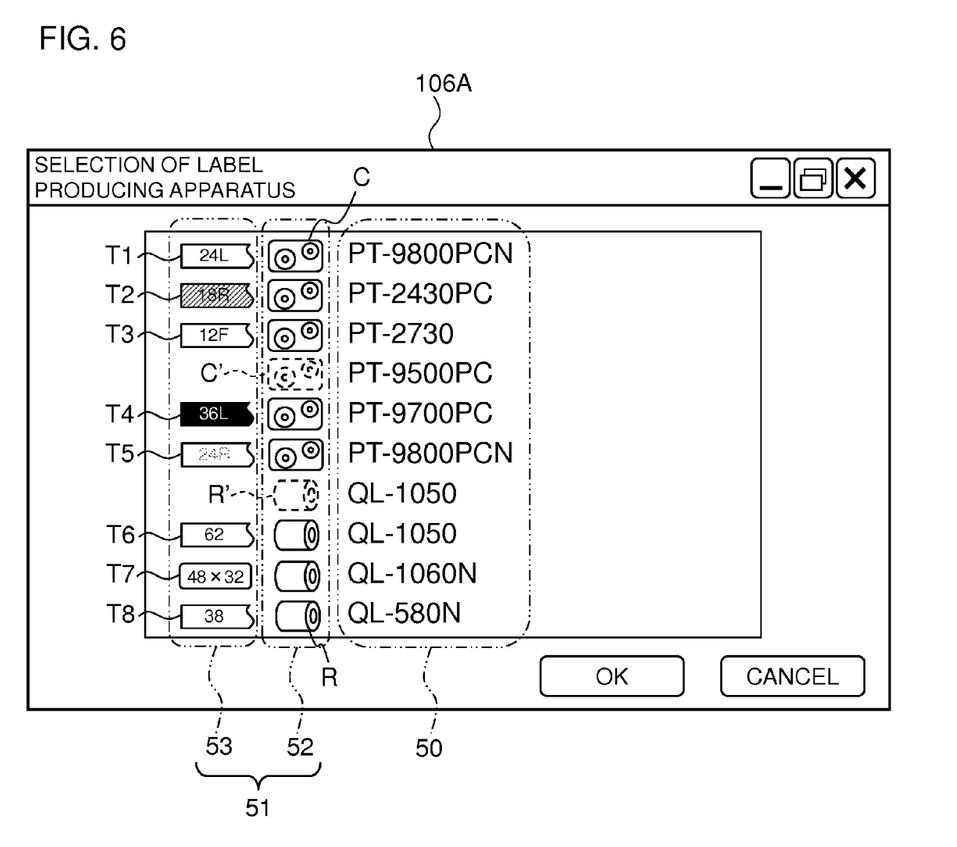
FIG. 6 is an explanatory view for explaining one example of a menu screen.

As shown in FIG. 6, on the menu screen 106A, displayed as a list are identification information 50 (product names in this example) of the plurality of label producing apparatuses 200 capable of information transmission and reception with the operation terminal 100, and medium information 51 corresponding to each of the identification information 50. The medium information 51 is separated into the above mentioned attachment and detachment type information 52 and the other medium information 53, and is displayed on the left of the identification information 50.

Display contents will be specifically explained. In the label producing apparatus 200 that is located at an uppermost row of a displayed list and has an apparatus name of "PT- 9800PCN", a mark C indicating a cartridge is displayed as the attachment and detachment type information 52. Accordingly, in the label producing apparatus 200, the print-receiving tape 10 is attached to and detached from the apparatus housing 200A as the cartridge 14. In addition, a mark T1 is displayed as medium information 53 other than the attachment and detachment type information 52. As for the mark T1, characters "24L" are described in a rectangular white frame whose one side is a break line. In this mark T1, the rectangular frame whose one side is the break line indicates that the print-receiving tape 10 is a non-fixed length type, and also a white color of the rectangular frame indicates that a tape color of the print-receiving tape 10 is white. In addition, the characters "24L" indicate that a tape width of the print-receiving tape 10 is 24 mm and that the cartridge 14 is the above mentioned laminate type, and also a black color of the characters "24L" indicates that a ribbon color of the ink ribbon 16 included in the cartridge 14 is black.

Similarly, since the mark C is displayed as the attachment and detachment type information 52 in the label producing apparatus 200 that is located at a second row of the displayed list and has an apparatus name of "PT-2430PC", the print-receiving tape 10 is attached to and detached from the apparatus housing 200A as the cartridge 14. In addition, a mark T2 displayed as the medium information 53 other than the attachment and detachment type information 52 indicates that the print-receiving tape 10 is the non-fixed length type as mentioned above, and also a green color of the rectangular frame (it is shown by oblique-line hatching in FIG. 6) indicates that a tape color of the print-receiving tape 10 is green. In addition, characters "18R" indicate that the tape width of the print-receiving tape 10 is 18 mm and that the cartridge 14 is the above mentioned receptor type, and also a black color of the characters "18R" indicates as mentioned above that the ribbon color of the ink ribbon 16 is black.

Similarly, since the mark C is displayed as the attachment and detachment type information 52 in the label producing apparatus 200 that is located at a third row of the displayed list and has an apparatus name of "PT-2730", the cartridge 14 is attached and detached. In addition, a mark T3 displayed as the medium information 53 other than the attachment and detachment type information 52 indicates as mentioned above that the print-receiving tape 10 is the non-fixed length type, and also indicates that the tape color is white. In addition, characters "12F" indicate that the tape width of the print-receiving tape 10 is 12 mm and that the cartridge 14 is the above mentioned fabric type, and also a black color of the characters "12F" indicates as mentioned above that the ribbon color of the ink ribbon 16 is black.

Meanwhile, in the label producing apparatus 200 that is located at a fourth row of the displayed list and has an apparatus name of "PT-9500PC", the medium information 53 is not displayed. This means that the detector 212 was not able to acquire medium information (in other words, it is detected that the print-receiving tape 10 is not loaded), and indicates that the cartridge 14 has not been loaded in the holder 202 of the label producing apparatus 200. It is to be noted that at this time, a dashed-line mark C' is displayed as the attachment and detachment type information 52. The dashed-line mark C' indicates that the print-receiving tape 10 is attached to and detached from the apparatus housing 200A as the cartridge 14, and that the cartridge 14 has not been loaded. From this, even when the cartridge 14 or the tape roll 12 has not been loaded in the label producing apparatus 200, the user can recognize which of the cartridge 14 and the tape roll 12 is dealt with by the each label producing apparatus 200.

In addition, since the mark C is displayed as the attachment and detachment type information 52 in the label producing apparatus 200 that is located at a fifth row of the displayed list and has an apparatus name of "PT-9700PC", the cartridge 14 is attached and detached. In addition, a mark T4 displayed as the medium information 53 other than the attachment and detachment type information 52 indicates as mentioned above that the print-receiving tape 10 is the non-fixed length type, and also the black color of the rectangular frame of the mark T4 indicates that the tape color of the print-receiving tape 10 is black. In addition, characters "36L" indicate that the tape width of the print-receiving tape 10 is 36 mm and that the cartridge 14 is the above mentioned laminate type, and also the white color of the characters "36L" indicates that the ribbon color is white.

Similarly, since the mark C is displayed as the attachment and detachment type information 52 in the label producing apparatus 200 that is located at a sixth row of the displayed list and has an apparatus name of "PT-9800PCN", the cartridge 14 is attached and detached. In addition, a mark T5 displayed as the medium information 53 other than the attachment and detachment type information 52 indicates as mentioned above that the print-receiving tape 10 is the non-fixed length type, and also indicates that the tape color is white. In addition, characters "24R" indicate that the tape width of the print-receiving tape 10 is 24 mm and that the cartridge 14 is the above mentioned receptor type, and also a red color (it is shown in gray in FIG. 6) of the characters "24R" indicates that the ribbon color is red.

Meanwhile, in the label producing apparatus 200 that is located at a seventh row of the displayed list and has an apparatus name of "QL-1050", similarly to the above described fourth row, the medium information 53 is not displayed, and a mark R' is displayed as the attachment and detachment type information 52. The dashed-line mark R' indicates that the print-receiving tape 10 is attached to and detached from the apparatus housing 200A as the tape roll 12, and that the tape roll 12 has not been loaded in the holder 202 of the label producing apparatus 200.

In addition, in the label producing apparatus 200 that is located at an eighth row of the displayed list and has an apparatus name of "QL-1050", a mark R indicating a tape roll is displayed as the attachment and detachment type information 52. Accordingly, in the label producing apparatus 200, the print-receiving tape 10 is attached to and detached from the apparatus housing 200A as the tape roll 12. In addition, a mark T6 displayed as the medium information 53 other than the attachment and detachment type information 52 indicates as mentioned above that the print-receiving tape 10 is the non-fixed length type, and also indicates that the tape color of the print-receiving tape 10 is white. In addition, a character "62" indicates that the tape width of the print-receiving tape 10 is 62 mm. It is to be noted that when the tape roll 12 is loaded, the thermal tape is used as the print-receiving tape 10 as mentioned above, and thus a printing color is limited to black. Accordingly, a color of the character "62" is also black.

Similarly, since the mark R is displayed as the attachment and detachment type information 52 in the label producing apparatus 200 that is located at a ninth row of the displayed list and has an apparatus name of "QL-1060N", the print-receiving tape 10 is attached to and detached from the apparatus housing 200A as the tape roll 12. In addition, in a mark T7 displayed as the medium information 53 other than the attachment and detachment type information 52, characters "48×32" are described in a corner-rounded rectangular white frame having rounded four corners. This mark T7 indicates that the print-receiving tape 10 is the above mentioned die-cut type by using the corner-rounded rectangular frame, and also indicates that the tape color is white. In addition, the characters "48×32" indicate that the width dimension W of the label mount 18 in the print-receiving tape 10 is 48 mm, and that the length dimension D thereof is 32 mm.

Similarly, since the mark R is displayed as the attachment and detachment type information 52 in the label producing apparatus 200 that is located at a lowermost row of the displayed list and has an apparatus name of "QL-580N", the tape roll 12 is attached and detached. In addition, a mark T8 displayed as the medium information 53 other than the attachment and detachment type information 52 indicates as mentioned above that the print-receiving tape 10 is the non-fixed length type, and also indicates that the tape color of the print-receiving tape 10 is white. In addition, a character "38" indicates that the tape width of the print-receiving tape 10 is 38 mm.

In the menu screen 106A as described above, the user selects the label producing apparatus 200 using the operation device 108 of the operation terminal 100, and operates an OK button displayed on a lower right, whereby the label producing apparatus 200, which is the print output destination, is set, and the image data is output from the operation terminal 100 to the label producing apparatus 200.

<Control Content>

Next, in order to achieve the above described display, a control content executed by the CPU 102 of the operation terminal 100 will be explained using FIG. 7. It is to be noted that a flow shown in FIG. 7 is started, for example, if the user performs appropriate operation to start printing.

First, in step S10, the CPU 102 acquires identification information of the each label producing apparatus 200 from the plurality of label producing apparatuses 200 capable of information transmission and reception with the operation terminal 100, respectively. Although the identification information is set as the product name of the each label producing apparatus 200 in the example shown in the above mentioned FIG. 6, it is not limit to this and, for example, may be a name etc. set by a network administrator.

Subsequently, in step S20, the CPU 102 determines whether or not the tape roll 12 or the cartridge 14 has been loaded in the holder 202 based on a signal from the detector 212. If both the tape roll 12 and the cartridge 14 have not been loaded (step S20: NO), the determination is not satisfied, and the process moves to later step S40. Meanwhile, if either of the tape roll 12 and the cartridge 14 has been loaded (step S20: YES), the determination is satisfied, and the process moves to next step S30.

In step S30, the CPU 102 acquires medium information on the loaded tape roll 12 or cartridge 14 from the label producing apparatuses 200 from which identification information has been acquired in the above described step S10. As mentioned above, in the medium information, included are the tape width, the tape color, the attachment and detachment type information, the ribbon color information, the cartridge type information, the tape type information, etc. of the print-receiving tape 10.

Subsequently, in step S40, the CPU 102 displays, on the display device 106, the above mentioned menu screen 106A for alternatively setting the label producing apparatus 200, which is the print output destination, from among the plurality of label producing apparatuses 200 capable of information transmission and reception with the operation terminal 100. At this time, as for the label producing apparatus 200 in which neither the tape roll 12 nor the cartridge 14 have been loaded, the CPU 102 displays as a list only the identification information 50 on the menu screen 106A since the medium information of the label producing apparatus 200 has not been acquired, and as for the label producing apparatus 200 in which either of the tape roll 12 and the cartridge 14 has been loaded, the CPU 102 displays as the list the identification information 50 and the medium information 51 on the menu screen 106A since the medium information of the label producing apparatus 200 has been acquired.

Subsequently, in step S50, the CPU 102 determines on the menu screen 106A displayed in the above described step S40 whether or not the user has selected any label producing apparatus 200 using the operation device 108 of the operation terminal 100. If the label producing apparatus 200 has not been selected (step S50: NO), loop wait is performed, and if the label producing apparatus 200 has been selected (step S50: YES), the determination is satisfied, and the process moves to next step S60.

In step S60, the CPU 102 outputs to the label producing apparatus 200 selected in the above described step S50 the image data that is printed and formed on the label L to be produced. Accordingly, the present flow is ended.

Advantages of Embodiment

In the embodiment explained above, the medium information on the loaded tape roll 12 or cartridge 14 is displayed as the list together with the identification information of the label producing apparatuses 200 on the menu screen 106A for alternatively setting the label producing apparatus 200, which is the print output destination, and thereby the user can immediately recognize which type of print-receiving tape 10 has been loaded in the each label producing apparatus 200. Accordingly, the user can easily select from the menu screen 106A the label producing apparatus 200 that can produce the desired label L without displaying a property of the each label producing apparatus 200 to thereby confirm the type of the loaded print-receiving tape 10 from the menu screen 106A, or actually seeing the each label producing apparatus 200 to thereby confirm the loaded print-receiving tape 10. Accordingly, convenience of the user can be significantly improved.

In addition, particularly in the present embodiment, the size (tape width) and the color of the print-receiving tape 10 loaded in the each label producing apparatus 200 are also displayed as the list on the menu screen 106A as the medium information. Accordingly, since the user can immediately recognize the size and the color of the print-receiving tape 10 loaded in the each label producing apparatus 200 only by viewing the menu screen 106A, he (she) can easily select from the menu screen 106A the label producing apparatus 200 that can produce the label L with a desired size and color. Accordingly, convenience of the user can be improved.

In addition, particularly in the present embodiment, on the menu screen 106A, as the medium information, also displayed as the list are the attachment and detachment type information 52 that indicates whether the print-receiving tape 10 is attached to and detached from the apparatus housing 200A as the tape roll 12, or is attached to and detached from the apparatus housing 200A as the cartridge 14. Accordingly, the user can immediately recognize which of the cartridge 14 and the tape roll 12 is dealt with by the each label producing apparatus 200 only by viewing the menu screen 106A. As a result of it, in the label L of a type dealt with only by the cartridge 14 (for example, a label produced by means of the laminate, receptor, or fabric type tape), or the label L of a type dealt with only by the tape roll 12 (for example, the die-cut type) being produced, it can be suppressed that the user selects the false label producing apparatus 200 as the print output destination.

In addition, particularly in the present embodiment, when the attachment and detachment type information indicates the cartridge, the ribbon color information of the ink ribbon 16 is also displayed as the list on the menu screen 106A as the medium information. Accordingly, the user can easily select from the menu screen 106A the label producing apparatus 200 that can produce the label L with a desired ink color. Accordingly, convenience of the user can be improved.

In addition, particularly in the present embodiment, when the attachment and detachment type information indicates the cartridge, on the menu screen 106A, as the medium information, also displayed as the list is the cartridge type information that indicates which is the print-receiving tape 10, the laminate type, the receptor type, or the fabric type. Accordingly, since the user can immediately recognize the type of the cartridge 14 loaded in the each label producing apparatus 200 only by viewing the menu screen 106A, he (she) can easily select from the menu screen 106A the label producing apparatus 200 that can produce the desired type (laminate, receptor, or fabric) of label L. Accordingly, convenience of the user can be improved.

In addition, particularly in the present embodiment, on the menu screen 106A, as the medium information, also displayed as the list is the tape type information that indicates which is the print-receiving tape 10, the non-fixed length type or the die-cut type. Accordingly, since the user can immediately recognize the type of the print-receiving tape 10 loaded in the each label producing apparatus 200 only by viewing the menu screen 106A, he (she) can easily select from the menu screen 106A the label producing apparatus 200 that can produce the desired type (non-fixed length or die-cut) of label L. Accordingly, convenience of the user can be improved.

In addition, particularly in the present embodiment, when the tape type information indicates the die-cut type, on the menu screen 106A, as the medium information, also displayed as the list are the width dimension W and the length dimension D of the label mount 18. Accordingly, since the user can immediately recognize a dimension of the label mount 18 in the die-cut type print-receiving tape 10 loaded in the each label producing apparatus 200 only by viewing the menu screen 106A, he (she) can easily select from the menu screen 106A the label producing apparatus 200 that can produce the label L with a desired dimension. Accordingly, convenience of the user can be improved.

Modified Example

It is to be noted that the present disclosure is not limited to the above described embodiment, and various modifications can be made without departing from the gist and the technical idea of the disclosure. Hereinafter, such modified examples will be explained in order.

Figure 8:
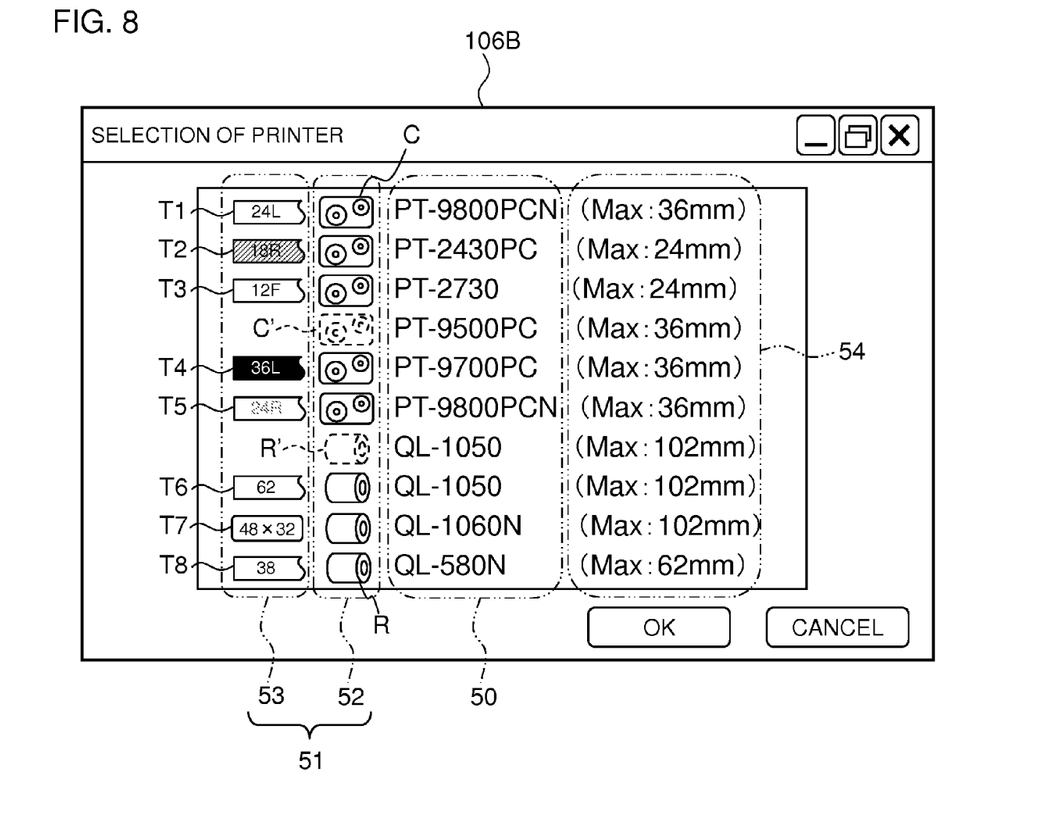
FIG. 8 is an explanatory view for explaining one example of a menu screen in a modified example where displayed are maximum sizes of tapes capable of being dealt with by label producing apparatuses.

(1) Case of Displaying Maximum Sizes of Tapes Capable of being Dealt with by Label Producing Apparatuses One example of a menu screen in the present modified example is shown in FIG. 8. As shown in FIG. 8, on a menu screen 106B, displayed as a list are the identification information 50 (product names in this example) of the plurality of label producing apparatuses 200 capable of information transmission and reception with the operation terminal 100, and a maximum tape width 54 (maximum size information) of the print-receiving tape 10 capable of being dealt with by the each label producing apparatus 200 in addition to the medium information 51 corresponding to each of the identification information 50. Also as for the label producing apparatus 200 in which neither the tape roll 12 nor the cartridge 14 have been loaded, the maximum tape width 54 is displayed.

That is, as for the label producing apparatus 200 in which neither the tape roll 12 nor the cartridge 14 have been loaded, the identification information 50 and the maximum tape width 54 are displayed on the menu screen 106B, and as for the label producing apparatus 200 in which either of the tape roll 12 and the cartridge 14 has been loaded, the identification information 50, the medium information 51, and the maximum tape width 54 are displayed.

It is to be noted that the maximum tape width is decided by a size of the holder 202 of the each label producing apparatus 200, and is previously stored in a memory device (not shown) etc. of the each label producing apparatus 200.

<Control Content>

Next, in order to achieve the above described display, a control content executed by the CPU 102 of the operation terminal 100 in the present modified example will be explained using FIG. 9.

A flow of FIG. 9 differs from the above mentioned FIG. 7 in a point where step S15 is newly added. Namely, in step S10, the CPU 102 acquires identification information of the each label producing apparatus 200 from the plurality of label producing apparatuses 200 capable of information transmission and reception with the operation terminal 100, respectively, and subsequently, the process moves to step S15.

In step S15, as for the each label producing apparatus 200 whose identification information has been acquired in the above described step S10, the CPU 102 reads and acquires from the above described memory device the maximum tape width 54 (maximum size information) of the print-receiving tape 10 capable of being dealt with by the each apparatus 200.

Since subsequent steps S20 to S60 are similar to the above mentioned FIG. 7, explanation thereof will be omitted. It is to be noted that in step S40, as mentioned above, as for the label producing apparatus 200 in which neither the tape roll 12 nor the cartridge 14 have been loaded, the CPU 102 displays as the list the identification information 50 and the maximum tape width 54 on the menu screen 106B, and that as for the label producing apparatus 200 in which either of the tape roll 12 and the cartridge 14 has been loaded, the CPU 102 displays as the list the identification information 50, the medium information 51, and the maximum tape width 54 on the menu screen 106B.

According to the modified example explained above, the maximum tape width 54 of the print-receiving tape 10 capable of being dealt with by the label producing apparatus 200 is displayed as the list on the menu screen 106B together with the identification information 50 of the label producing apparatus 200, and thereby the user can immediately recognize a specification regarding the tape size of the each label producing apparatus 200. Particularly, when the tape roll 12 or the cartridge 14 has not been loaded in the label producing apparatus 200, the user needs to examine a tape size capable of being dealt with by the each label producing apparatus 200 by seeing an instruction manual and a specification document since the medium information 51 is not displayed, thus requiring a great labor. In the present modified example, the user can immediately understand the label producing apparatus 200 in which the print-receiving tape 10 with a desired tape width can be loaded only by viewing the menu screen 106B without performing such confirmation work. Accordingly, for example, when the label producing apparatus 200 in which the print-receiving tape 10 with the desired tape width has been loaded is not displayed on the menu screen 106B, the user understands from the menu screen 106B the label producing apparatus 200 in which the tape can be loaded, loads the corresponding tape roll 12 or cartridge 14 in the label producing apparatus 200, and subsequently, can easily select the label producing apparatus 200 from the menu screen 106B. Accordingly, convenience of the user can be significantly improved.

(2) Other Cases

It is to be noted that in the above, arrows shown in FIG. 2 indicate one example of a flow of a signal, and that a flow direction of the signal is not limited by this. In addition, flow charts shown in FIGS. 7 and 9 do not limit the present disclosure to steps shown in the above described flows, and addition and removal of the steps or change in order, etc. may be made without departing from the gist and the technical idea of the disclosure.

In addition, techniques by the above described embodiment and the each modified example may be appropriately combined and utilized in addition to the examples already mentioned above.

What is claimed is:

1. A non-transitory computer readable recording medium storing a label production processing program for executing steps on an arithmetic device of an operation terminal comprising a display device and said arithmetic device, to operate a label producing apparatus configured to print on a print-receiving medium configured to be attached to and detached from an apparatus housing and configured to produce a label, said steps comprising:

acquiring identification information from a plurality of label producing apparatuses configured to transmit and receive information;

acquiring medium information on an attached print-receiving medium from each label producing apparatus from which said identification information has been acquired; and displaying a menu screen on said display device in which said identification information and said medium information corresponding to said identification information are displayed together in a list, to set alternatively a label producing apparatus as a print output destination from among the plurality of label producing apparatuses, wherein said medium information acquiring at least one of a size and a color of said print-receiving medium, wherein said medium information acquiring attachment and detachment type information that indicates whether a print-receiving tape as said print-receiving medium is attached to and detached from said apparatus housing as a tape roll wound in a rolled form, or said print-receiving tape is attached to and detached from said apparatus housing as a cartridge which stored said tape roll in a case, wherein said medium information acquiring, in a case where said attachment and detachment type information indicates said cartridge, ribbon color information of an ink ribbon provided in said cartridge, wherein said medium information acquiring, in a case where said attachment and detachment type information indicates said cartridge, cartridge type information that indicates whether a cartridge type is a laminate type in which said print-receiving tape is a cover film laminated on a base tape, is a receptor type in which said print-receiving tape is said base tape, or is a fabric type in which said print-receiving tape is made of a cloth material, wherein said medium information acquiring tape type information that indicates whether said print-receiving tape is a non-fixed length type, or said print-receiving tape is a die-cut type in which label mounts previously separated as a desired size corresponding to said label to be produced are continuously arranged on a tape fed out from said tape roll, wherein said medium information acquiring, in a case where said tape type information indicates said non-fixed length type, a width dimension of said print-receiving tape, and said medium information acquiring, in a case where said tape type information indicates said die-cut type, a width dimension and a length dimension of said label mount, and wherein said arithmetic device is further caused to execute:

acquiring maximum size information of said print-receiving medium configured to being dealt with by each label producing apparatus from which said identification information has been acquired, wherein:

said displaying on said display device, in a case where said print-receiving medium has not been attached to said apparatus housing, said menu screen in which said identification information and said maximum size information corresponding to said identification information are displayed together in a list, and said displaying on said display device, in a case where said print-receiving medium has been attached to said apparatus housing, said menu screen in which said identification information, said medium information and said maximum size information corresponding to said identification information are displayed together a list.

2. A non-transitory computer readable recording medium storing a label production processing program for executing steps on an arithmetic device of an operation terminal comprising a display device and said arithmetic device, to operate a label producing apparatus configured to print on a print-receiving medium configured to be attached to and detached from the label producing apparatus and configured to produce a label, said steps comprising:

acquiring identification information of each label producing apparatus of a plurality of label producing apparatuses configured to transmit and receive information;

determining, for each label producing apparatus for which identification information has been acquired, if a print-receiving tape is attached to and detached from the label producing apparatus as a tape roll wound in a rolled form or if the print-receiving tape is attached to and detached from the label producing apparatus as a cartridge which stored the tape roll in a case;

acquiring medium information from each label producing apparatus for which identification information has been acquired when determining that the print-receiving tape is attached to and detached from the label producing apparatus; and displaying a menu screen on the display device in which the identification information, for each label producing apparatus configured to transmit and receive information, and the medium information, for each label producing apparatus for which identification information has been acquired when determining that the print-receiving tape is attached to and detached from the label producing apparatus, are displayed in a list, to allow alternatively setting of the label producing apparatus to be a print output destination from among the plurality of label producing apparatuses, wherein when determining that the print-receiving tape is attached to and detached from the label producing apparatus as the cartridge, the acquired medium information includes ribbon color information of an ink ribbon provided in the cartridge, wherein when determining that the print-receiving tape is attached to and detached from the label producing apparatus as the cartridge, the acquired medium information includes cartridge type information that indicates whether a cartridge type is a laminate type in which the print-receiving tape is a cover film laminated on a base tape, is a receptor type in which the print-receiving tape is the base tape, or is a fabric type in which the print-receiving tape is made of a cloth material, wherein the acquired medium information includes tape type information that indicates whether the print-receiving tape is a non-fixed length type, or the print-receiving tape is a die-cut type in which label mounts previously separated as a desired size corresponding to the label to be produced are continuously arranged on a tape fed out from the tape roll, wherein the acquired medium information includes, in a case where the tape type information indicates the non-fixed length type, a width dimension of the print-receiving tape, wherein the acquired medium information includes, in a case where the tape type information indicates the die-cut type, a width dimension and a length dimension of the label mount, and wherein the arithmetic device is further caused to execute:
acquiring maximum size information of the print-receiving medium that the label producing apparatus from which the identification information has been acquired is configured to handle, wherein
the displaying, in a case where the print-receiving medium has not been attached to the label producing apparatus, displays the menu screen in which the identification information and the maximum size information corresponding to the identification information are displayed in a list, and
the displaying, in a case where the print-receiving medium has been attached to the label producing apparatus, displays the menu screen in which the identification information, the medium information and the maximum size information corresponding to the identification information are displayed as a list.

3. The recording medium according to claim 2, wherein the acquired medium information includes at least one of a size and a color of the print-receiving medium.

* * * * *